Dec. 7, 1937.　　　H. A. TOULMIN, JR　　　2,101,203

MEASURING INSTRUMENT

Filed Jan. 21, 1936

INVENTOR
HARRY A. TOULMIN, Jr.,
BY *Toulmin & Toulmin*
ATTORNEYS

Patented Dec. 7, 1937

2,101,203

UNITED STATES PATENT OFFICE 2,101,203

MEASURING INSTRUMENT

Harry A. Toulmin, Jr., Dayton, Ohio, assignor to Business Corners, Inc. of Delaware, Dayton, Ohio, a corporation of Delaware Application January 21, 1936, Serial No. 60,147

7 Claims. (Cl. 171—95)

My invention relates to measuring instruments.

It is the object of the invention to provide a measuring instrument which can indicate a small unit of measurement in an enlarged size so as to make the observation easy and accurate.

It is a further object to provide an instrument in which two measurements may be simultaneously indicated on a common scale.

It is a further object to provide an instrument in which the major portion of the instrument may be made standard and uniform, while the adaptors can be varied according to the type of measurement to be made so that a single measuring instrument may be employed for measuring sizes, speeds, temperatures, liquid depths and quantities and the like.

It is a further object of the invention to provide an instrument in which the proportions of two measurements may be simultaneously indicated upon a common measuring scale.

It is a further object to provide an instrument in which the scale may be actuated in order to calibrate the instrument or correct the calculations during the course of its use.

It is a further object to provide an instrument in which the scale may be moved relative to the indicating beam or beams of light so as to permit of calculations to be made on the scale.

Referring to the drawing.

Figure 1:
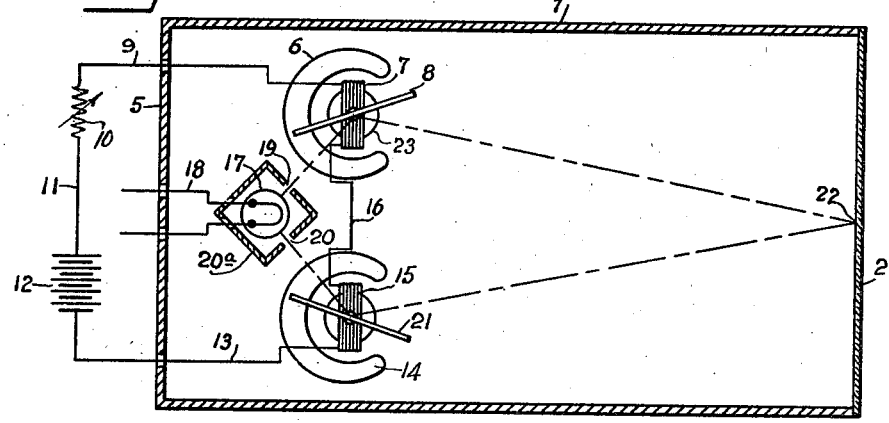
Figure 1 is a plan view of the instrument with the ground glass scale and instrument box in section showing a simple electrical circuit, the variation of capacity of which will reflect itself in the deflection of the indicating elements.
Figure 2:
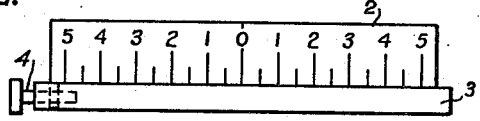
Figure 2 is a front elevation in detail of the adjustable scale which is transparent or translucent.

Referring to the drawing in detail, 1 indicates the side walls of a box having a ground glass scale screen 2 at one end thereof which is supported in a support 3 that is adjustable transversely of the box by the adjusting screw 4. The rear wall of the box is designated 5. Within the box is located a horse shoe magnet 6 partially surrounding a coil 7 upon the spindle of which is mounted a light mirror 8. The wire 9 is connected to coil 7 which in turn is connected to an instrumentality 10 for varying the electrical condition of the circuit which includes the wire 9, wire 11, the battery 12, the wire 13 with the associated coils 7 and 15 to which the wire 13 is connected. The coils 7 and 15 are connected by the wire 16 that is a part of the circuit. Any suitable source of current such as a battery 12 or any other power source may be utilized. As the electrical value of the circuit changes, the mirrors are deflected. A light source 17 supplied by the circuit 18 with current sends beams through the slots 19 and 20 of the box 20a respectively onto the mirrors 8 and 21. When the circuit is unenergized, the mirrors are in the position indicated and the light beams follow the dot and dash lines so that they coincide at 22 in a vertical line or bar of narrow dimensions upon the scale 2.

Figure 3:
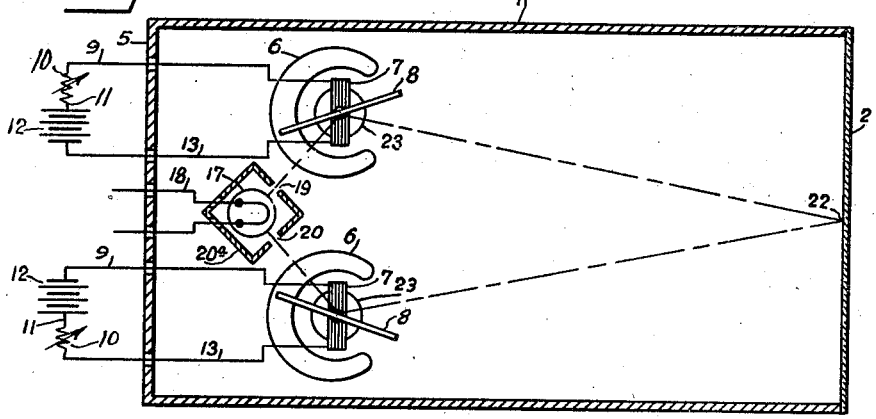
Figure 3 is a view similar to Figure 1 showing an arrangement by which each reflecting mirror is controlled by a separate measured electric circuit instead of a single interconnected circuit as in Figure 1.

Light springs serve to maintain the coils and mirrors in their normal positions as indicated. The springs are designated 23. When the circuit is energized, the horse shoe magnets being permanently energized the coils are deflected with their mirrors 8 and 21 so that the beam or beams reflected from the mirrors travel across the scale 2, indicating the extent of the change in the electrical circuit supplied by the battery 12. When the electrical circuit in which the coils 7 and 15 are inserted is in its normal, undisturbed state, then the position of the mirrors 8 and 21 is as shown in Figures 1 and 3. In such position the light beams reflected from the mirrors converge upon the scale 2 at the line or point 22. As soon as the resistance or variable impedance 10 is operated so as to indicate a measurement, the balance of the circuit is disturbed so that the coils are affected an equivalent amount so as to bring about the movement of the mirrors 8 and 21 to cause the light beams reflected by the mirrors to diverge. The extent of the divergence is indicated upon and measured by the scale 2. Upon the elimination of this disturbance of the circuit the mirrors return to their initial position as shown in Figures 1 and 3.

It will be understood that I desire to comprehend within my invention such modifications as come within the scope of my claims and my invention.

Having thus fully described my invention, what I claim as new and desire to secure by Letters Patent, is:

1. In combination, means for producing and directing diverging light beams, a pair of rotatable mirrors adapted to receive said beams, a scale for receiving said light beams, and electrical means including a single series electric circuit for simultaneously positioning both said mirrors to adjust the light beams by movements of said beams toward or away from each other on said scale.

2. In combination, means for producing and directing diverging light beams, a pair of rotatable mirrors adapted to receive said beams, a scale for receiving said light beams, electrical means including a single series electric circuit for simultaneously positioning both said mirrors to adjust the light beams on said scale, and means in said electric circuit for varying the current therein to vary the deflection of said mirrors so as to cause said beams to move towards or away from each other.

3. In combination, an enclosure having a scale at one end on which a light beam from the inside can be indicated on the outside thereof, a pair of rotatable mirrors, a common light source, means of directing light beams therefrom onto said mirrors and thence onto said scale, coils associated respectively with said mirrors, permanent magnets associated respectively with said coils and a single series electric circuit including said coils, the current flow in which circuit determines the deflection of said mirrors, and means for changing the current in said electric circuit to change the deflection of the mirrors so that the positions of the light beams on the scale reflected from the mirrors are caused to converge to a single point on the scale or move away from said point in opposite directions.

4. In combination, an oblong enclosure having a light transmitting scale at one end thereof, a second smaller enclosure having light beam ports and a light therein located at the opposite end of the first enclosure, a pair of rotatable angularly disposed mirrors on either side of the second enclosure within the first enclosure adapted to receive said light beams and transmit them to the light transmitting end of the first enclosure, a permanent magnet and a coil associated with each of said mirrors, and a single series electric circuit including both coils for varying simultaneously the current in said coils, to deflect simultaneously said mirrors.

5. In combination, a light source, means for controlling the direction of beams from said light source over a relatively short path, rotatable reflecting mirrors adapted to deflect said beams to a ground glass scale, and electrical means for actuating said mirrors including a single series electrical circuit and a means for varying its resistance to unbalance said circuit and cause movement of said mirrors in proportion to the measurement effected, whereby the divergence of the light beams on the scale will indicate and amplify the measurement so secured.

6. In combination, an end closure, a transparent scale on one end thereof adapted to indicate the position of light beams which are directed on the interior of the scale and readable from the exterior thereof, a pair of rotatable mirrors, a coil and a permanent magnet associated with each mirror, an electrical energizing series circuit including said coils, means for varying the current in said circuit for simultaneously moving said mirrors and positioning them so as to cause the beams of light reflected from said mirrors to move along said scale in opposite directions from a central point, or towards said point, comprising means in said circuit for varying the resistance thereof, and a light source for producing and directing beams on to said mirrors whereby the variations in resistance in the said circuit will be proportionately amplified and indicated on the scale by the position of the light beams thereon.

7. A measuring instrument indication amplifying means comprising: a single series circuit including at least two indicating instrument units, each unit supporting a mirror which is positioned according to the magnitude of the quantity under measurement, means for directing beams of light on the several mirrors simultaneously, and a calibrated image screen for receiving said beams of light, whereby the distance between light traces appearing as images on the screen is amplified in proportion to the number of units which simultaneously cast beams on the screen.

HARRY A. TOULMIN, Jr.